Sept. 29, 1959
B. VER NOOY
2,906,295
PIPE LINE PLUGGER
Filed July 1, 1957
4 Sheets-Sheet 2
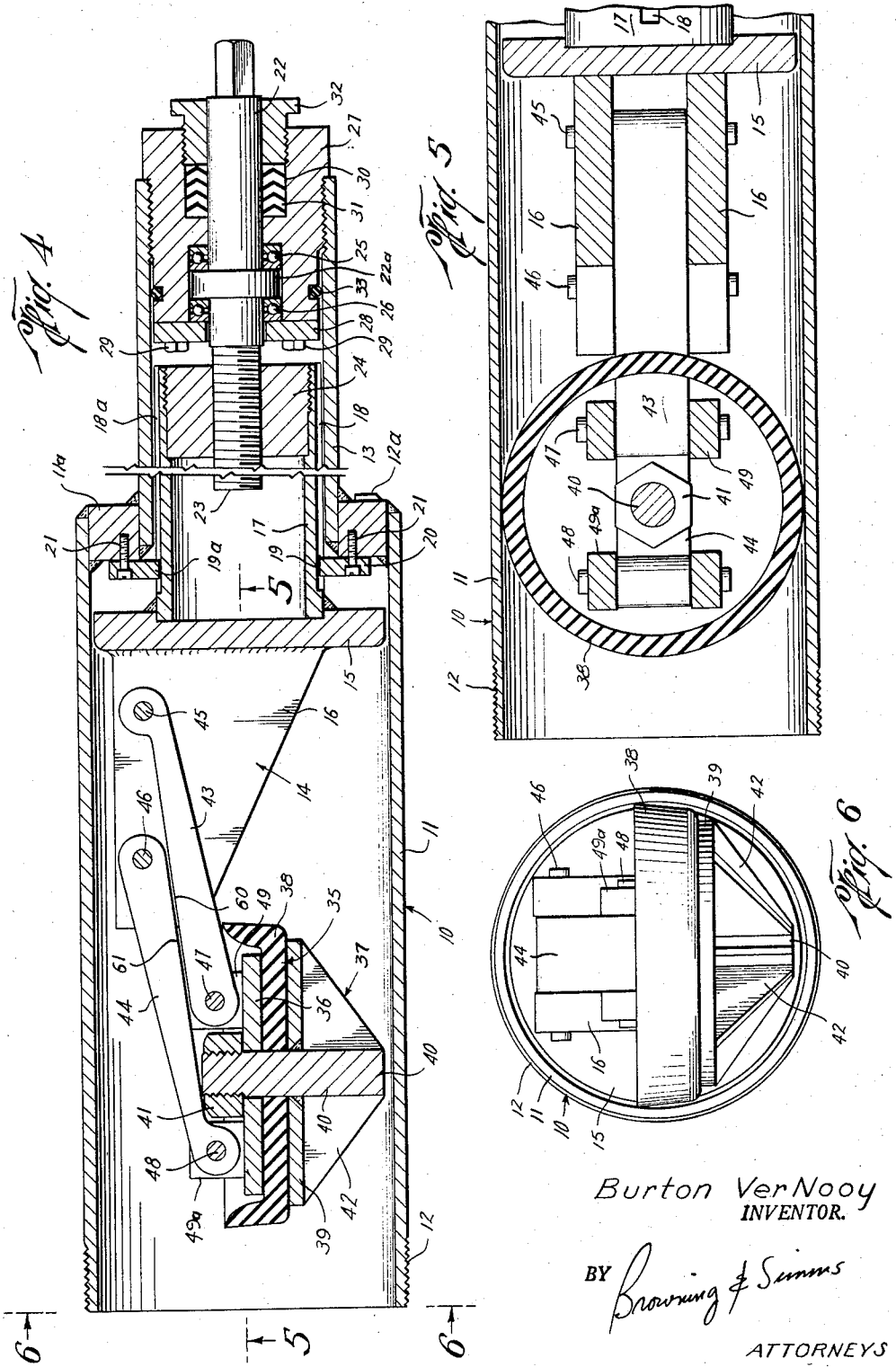
Burton VerNooy
INVENTOR.
BY Browning & Simms
ATTORNEYS Sept. 29, 1959 B. VER NOOY 2,906,295
PIPE LINE PLUGGER
Filed July 1, 1957 4 Sheets-Sheet 3

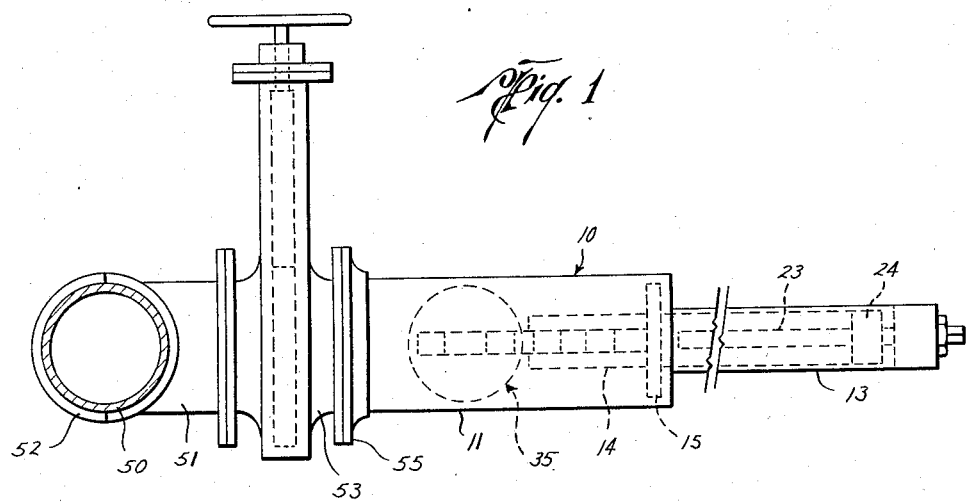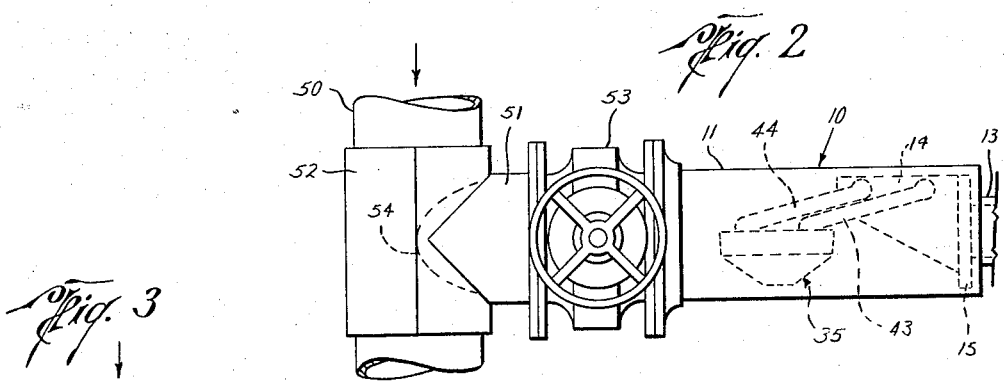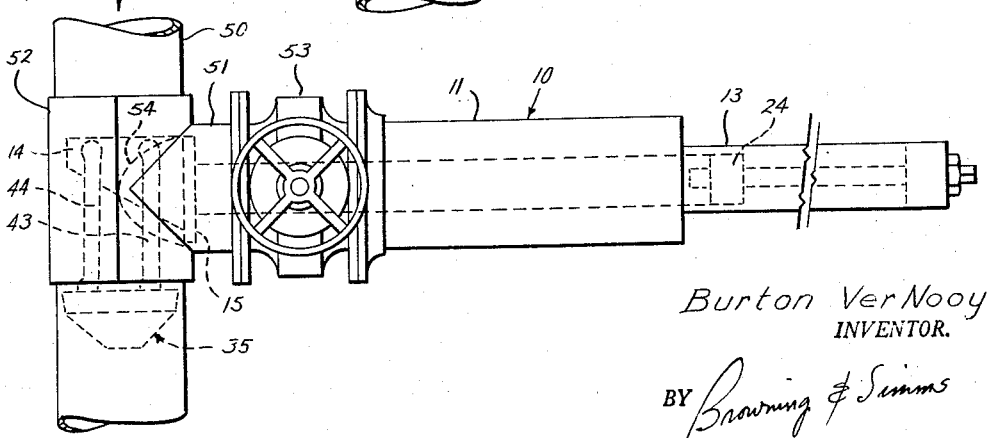

Burton Ver Nooy
INVENTOR.

BY Browning, Simms & Hyer
ATTORNEYS.

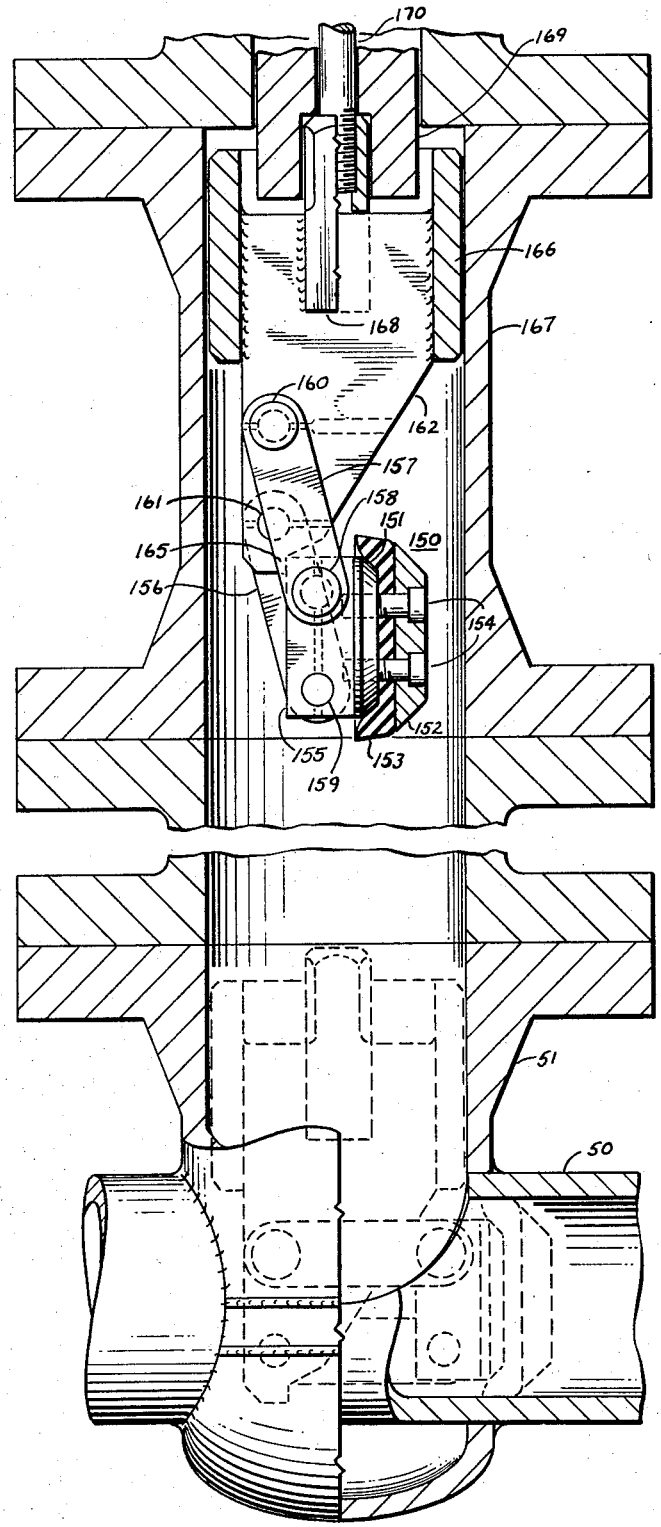
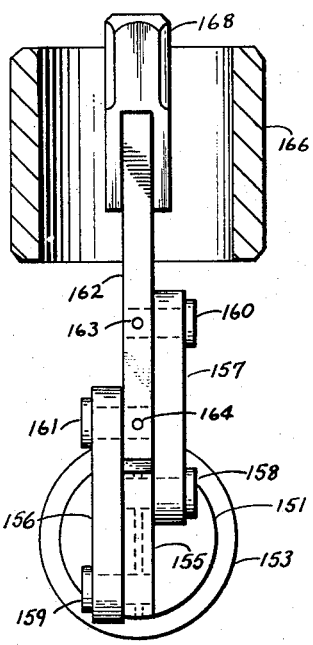

United States Patent Office 2,906,295
Patented Sept. 29, 1959

2,906,295

PIPE LINE PLUGGER

Burton Ver Nooy, Tulsa, Okla., assignor to T. D. Williamson, Inc., Tulsa, Okla.

Application July 1, 1957, Serial No. 669,380

27 Claims. (Cl. 138—94)

This invention relates to a pipe line plugger of the type having a plugging member insertable into a pipe line through a lateral opening in the line.

This application is a continuation-in-part of my copending application, S.N. 465,085, filed October 27, 1954, and entitled "Pipe Line Plugger," now abandoned.

In the maintenance of pipe lines, it is often necessary to isolate a portion of the line in order that such portion can be repaired, replaced, or alterations made therein. For example, should a section of pipe line become ruptured so as to spring a leak, it is desirable to isolate such section from fluid communication with adjacent portions of the line. Upon being isolated, only the isolated section need be drained for repairs, the remainder of the line remaining full of fluid. To so isolate sections of pipe line, pluggers have been provided which can be mounted on the pipe line to insert a plugging means into the line through a lateral opening therein.

In the past, pipe line pluggers have been relatively complex machines which are not only expensive to manufacture and heavy to transport but have been subject to failure when used at high pressures. Such pluggers quite often employ a carrier with an expandable valve means on the end, the latter being insertable into the pipe line via a lateral opening therein and then expanded in the pipe line to form a plug. The valve means frequently comprises a rubber boot or strip having an internal mechanism for expanding the boot or strip into sealing engagement with the inner walls of the pipe line. This arrangement requires at least two mechanisms, (1) one for moving the valve means into the pipe line and (2) one for expanding the valve means after it has been situated in the line. Not only does this unduly complicate the structure and its use but it also makes it difficult to design one sufficiently strong to withstand the high pressures often encountered in pipe lines and this design problem is particularly troublesome in connection with the larger sizes of plugger, e.g. for pipe lines six inches and up in size.

Also, the valve means so constructed requires that the pipe line at the point where the plug is formed to be substantially in round and free from any substantial internal irregularities in contour in order to form a fluid tight seal. This is true because the expanding mechanism for the boot or seal strip is usually comprised of expandable metal elements presenting a circular outer periphery to press the boot or strip against the inner wall of the pipe line. Accordingly, the maximum permissible irregularity in pipe contour is small in order to achieve a good seal.

A still further disadvantage of these prior machines is that they have been so constructed that it is necessary not only to provide a seal between the valve means forming the plugging element and the pipe line but also a seal between the plugging element and the plugger housing from which the plugging element was interposed into the pipe line. The principal reason for the necessity of such structure is that the plugging element is inserted into the lateral opening in the pipe line immediately and axially adjacent the plugger housing so that as a result, the plugging element seals with interior of the pipe line only around a portion of the line's inner periphery, the remainder of the plugging element being exposed in the lateral opening of the pipe line so that fluid could flow therepast were the seal between the housing and plugging element not provided. Such a plurality of seals further complicates the structure and renders it more likely to leak.

It is an object of this invention to provide a pipe line plugger which is relatively simple in construction and positive in operation and which employs a plug element or member adapted to be inserted through a lateral opening in the pipe line and then moved along the pipe line into sealing position at one side of the lateral opening.

Another object of this invention is to provide a pipe line plugger in which a plug element or member is pivotally connected to a carrier means in such a manner that upon actuation of the carrier means, the plug element is moved through a lateral opening in the pipe line and then advanced along the pipe line to a position at one side of the lateral opening where it extends transversely across the pipe line and can form a peripheral seal therewith.

Another object of this invention is to provide such a pipe line plugger wherein the plug element includes a solid rigid body having no moving parts and carrying a peripheral seal so that the plug element can be made very strong to withstand relatively high pressures frequently encountered in pipe lines.

Another object of this invention is to provide a pipe line plugger in which such a plug element is linked to a carrier, as by a parallelogram linkage, in such a manner that upon advancing the carrier toward the pipe line, the plugging element will be moved out of the plugger housing and through an opening in the pipe line until it is situated internally of the line and then, advanced along the line to a final plugging position situated at one side of the lateral opening, the linkage between the plug element and the carrier means then serving to retain the plug element in plugging position despite relatively high fluid pressures applied thereto.

Another object of this invention is to provide such a pipe line plugger wherein a lip type seal is provided on the plug element so that with the element is plugging position, the seal is urged against the entire internal periphery of the pipe line by fluid pressure applied thereto by pipe line fluid thereby not only simplifying the requisite seals carried by the plugger but also accommodating irregularities in the internal contour of the cross-section of the pipe line.

Another object of this invention is to provide a pipe line plugger in which a plug element can be advanced and properly positioned in a pipe line and retracted therefrom merely by rotating a single shaft thereby facilitating the ease with which the plugger can be made fluid tight.

Other objects, advantages and features of this invention will be apparent to one skilled in the art upon the consideration of the written specification, the appended claims and the attached drawings, wherein:

Fig. 1 is a schematic view of an embodiment of the apparatus of this invention installed upon a pipe line, the view being taken at right angles to the pipe line;

Fig. 2 is a view taken at right angles to that of Fig. 1 and shows the plug element or member of this invention retracted into the plugger housing;

Fig. 3 is a view similar to Fig. 2 except that the plug element has been advanced into plugging position in the pipe line;

Fig. 4 is a view of one embodiment of the apparatus of this invention taken in longitudinal cross-section with the plugging element retracted into the plugger housing;

Fig. 5 is a view taken on the line 5—5 of Fig. 4;

Fig. 6 is a view taken on the line 6—6 of Fig. 4;

Fig. 9 is a partially sectioned elevation of another embodiment of the apparatus of Fig. 4 illustrating the plugging element in a retracted position, and with a phantom showing of the plugging element in plugging position.

Fig. 10 is a false section of Fig. 9 taken to view the linkage between the plugging and the carrier from the left of Fig. 9.

Like characters of reference are used throughout the several views to designate like parts.

Figure 8:
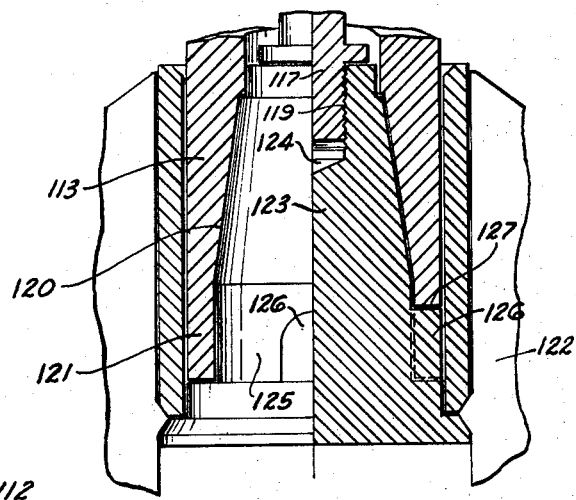
Fig. 8 is a detailed view showing an adapter permitting connection between the plug element and a tapping or boring machine.

The pipe line plugger of this invention includes a carrier part axially movable within a plugger housing, the arrangement being such that as the carrier part is advanced toward the pipe line, the plug member will be moved out of the plugger housing, through a lateral opening in the pipe line and then sidewise along the length of the pipe line until the plug member is seated at one side of the lateral opening. When in such seated position, the plug member is so situated that it extends transversely of the pipe line thereby preventing fluid flow along the pipe line past the plug member.

Since the plug member is situated at one side of the lateral opening and in a portion of the pipe line having an uninterrupted or uncut periphery, it is possible for the plug member to form a seal with the inside walls of the pipe line around its entire periphery. The plug member is made to be substantially the same size as the inside diameter of the pipe line which permits the plug member to have a rigid body portion extending across the major portion of the cross-section of the pipe line so that the plug member can be made very strong to resist high pipe line pressures. Also, a lip type seal can be employed as the peripheral sealing means around the body portion so that the extent of sealing with the pipe line will be somewhat dependent upon pipe line pressures instead of mechanical means operated from outside the pipe line as has heretofore been the practice.

The carrier part can be advanced and retracted by a suitable arrangement preferably including a rotatable shaft so that the only required manipulation to seat and unseat the plug member is rotation of the shaft. By providing a fluid tight housing around the plug member and carrier part, which housing is open only to pipe line pressure, and a seal between the shaft and housing, the parts within the housing, e.g. the carrier part and plug member can be exposed on all sides to the fluid pressure of the pipe line. As a result of such an arrangement, pipe line fluid exerts substantially no force on the plug member or carrier part tending to resist their advancement toward or away from the pipe line and it is relatively easy to advance and retract the carrier part and plug member. While the pipe line fluid does act across the effective cross-sectional of the shaft to urge it in a direction away from the pipe line, i.e. to urge the shaft from the housing, such urging is relatively inconsequential since the shaft is only rotated and need not be advanced against such pressure. Also, it can be made small so that the pressure differential across the same results in only a relatively small force.

Referring now to the drawings and particularly to Figs. 4 through 6, there is provided a plugger housing, designated generally by the numeral 10, including a tubular part 11 having threads 12 or a flange or other means adjacent one end for connecting the housing to a branch of the pipe line or to a valve mounted thereon. The end of the housing adjacent threads 12 is open and the other closed by an annular ring 11a which carries a tubular housing extension 13.

Mounted on the housing is a carrier means for advancing and retracting the plug member. Such means can include a carrier part 14 axially movable along the housing toward and away from the pipe line to which the housing is connected and means for so moving the carrier part. The carrier part can comprise a circular plate 15 from which depends a pair of flanges or ears 16.

Slide and guide means are provided for preventing relative rotation between the carrier part 14 and housing 10 thereby permitting indexing the carrier part with respect to the pipe line while retracted and then advancing such part without changing its rotative position relative to the pipe line. Such means includes an elongate tubular member 17 having keyways 18 and 18a therein which are engaged by keys 19 and 19a carried upon an annular keying ring 20. The latter can be rigidly secured to ring 11a as by bolts 21. With this construction, it will be apparent that the carrier part 14 can move axially through housing 10 and will be maintained against relative rotation with respect to the housing by the engagement of keys 19 and 19a in keyways 18 and 18a, respectively.

Means are provided for axially moving the carrier part through housing 10, including a rotatable shaft 22 carried by the housing and fixed against endwise movement relative to the housing. Shaft 22 includes an elongate threaded portion 23 engaging jack screw nut 24 carried by tubular part 17. The length of threaded portion 23 is sufficient that nut 24 and carrier part 14 can be advanced out of housing 10 a desired distance, that is, one sufficient to suitably seat the plug member carried by the carrier part in the pipe line. Similarly, tubular part 17 must be sufficiently long to receive the length of threaded portion 23 extending below nut 24 when carrier part 14 is retracted to its position most remote from the pipe line.

Shaft 22, as stated above, is fixed against endwise movement relative to housing 10. This can be accomplished by providing an annular shoulder 22a situated between thrust bearings 25 and 26. The bearings are carried by stuffing box 27 threaded to housing extension 13, and are retained in place by a retainer ring 28 connected to the stuffing box as by bolts 29. The outer end of the stuffing box is provided with an annular recess 30 into which a packing 31, preferably chevron packing or the like, can be disposed to provide a seal between shaft 22 and stuffing box 27. A suitable packing gland 32 can be threaded into the stuffing box to tighten the packing. Additionally, a seal, such as O-ring 33, can be provided between the stuffing box 27 and housing extension 13 to prevent escape of fluids.

With this arrangement, it will be apparent that shaft 22 can be rotated to cause nut 24 to travel along threaded portion 23 of the shaft with corresponding axial movement of carrier part 14. Endwise movement of the shaft 22 is prevented by retaining shoulder 22a between bearings 25 and 26. At the same time, rotation of tubular part 17 is prevented by the key and keyway structure described above. As a result, a single manipulative motion, namely the rotation of shaft 22, can advance and retract carrier part 14 along housing 10 for the purpose described below.

A plug member or element, designated generally by the numeral 35, is provided to be insertable into the pipe line to form a plug therein. Such member is preferably circular in contour and of substantially the same outside diameter as the inside diameter of the pipe line. Also, it preferably employs a peripheral seal adapted to abut and sealingly engage the inner walls of the pipe line. Thus, the plug member can include a solid body portion including a flange 36 and a nose assembly 37 for backing up a suitable sealing cup 38 disposed therebetween. The nose assembly includes another flange 39 and stud 40 which extends through cup 38 and flange 36 to receive nut 41, the latter permitting tightening of flanges 36 and 39 against the cup to hold it securely in place.

To strengthen flange 39, a plurality of triangular gusset plates 42 are disposed radially therearound and are affixed to stud 40.

Thus, there has been provided a plug member having a periphery adapted to abut the inner walls of the pipe line and preferably such periphery includes a seal for engaging the inner walls of the pipe line. The cross-sectional configuration of the periphery is such that with the plug element situated in seated position in the pipe line, such as radially thereacross, the peripheral seal contacts the inner walls of the pipe line and prevents flow of fluid past the plug member. In a preferred embodiment, the peripheral seal is of the lip type with the lip extending in the direction from which fluid pressure is applied to the plug member. With such construction, the internal cross-section contour of the pipe line can be irregular, such as out-of-round, rough, scored, etc., and yet the lip type seal can accommodate such irregularities, the lip being forced into tight engagement with the inner walls of the pipe line by the fluid pressure itself. Of course, the diameter of the seal is such that upon insertion of the plug member into the pipe line, an initial seal is made and thereafter the fluid pressure will act to increase the effectiveness of the seal.

Means are provided for pivotally connecting the carrier part and the plug member so as to permit the plug member, upon movement of the carrier part away from the pipe line, to swing towards the axis along which carrier part 14 moves whereby the plug member can be retracted to a position axially adjacent to the carrier part and thence into the housing, the connecting means also permitting plug member 35, upon movement of the carrier part towards the pipe line, to swing away from such axis of movement of the carrier part so that the plug member, after passing through the lateral opening in the pipe line, can be moved laterally along the pipe line to position it at one side of the lateral opening in the line. Such means can include arms 43 and 44 each connected pivotally to the carrier part by pivots 45 and 46, respectively, for swinging movement about the carrier part. The pivot axes of pivots 45 and 46 extend transversely of the axis along which part 14 moves. The other ends of arms 43 and 44 are pivoted as by pivots 47 and 48, respectively, to the plug member. Such pivots can be connected to plate 36 by ears 49 and 49a. The pivot axes of pivots 47 and 48 are substantially parallel to the pivot axes of pivots 45 and 46. In a preferred embodiment, the lengths of arms 43 and 44 are substantially equal and the distance between pivots 45 and 46 is substantially equal to the distance between pivots 47 and 48. In effect then, plug element 35 is connected to part 14 by parallelogram linkage maintaining the plane of seal 38 substantially parallel to the axis along which part 14 moves.

In operation, the plugger apparatus described above is mounted upon a pipe line 50 as illustrated in Figs. 1 through 3. The pipe line is provided with a T branch 51 having an inside diameter substantially the same as the inside diameter of pipe line 50. Where the plugger is to be mounted upon a section of pipe line not normally provided with such a T, a saddle 52, including the T branch, can be welded to the pipe line and a suitable gate valve 53 connected to the T branch. A tapping machine, of a type well known to those skilled in the art, can then be mounted upon the valve, the valve opened, and the tapping machine operated to cut an opening 54 in one wall of pipe line 50. Such an opening should have, viewed through valve 53, a diameter substantially equal to the inside diameter of T branch 51. In other words, the opening will correspond to the projection of a circle upon the pipe line and will extend across about 180° of the pipe line circumference. Upon cutting of the opening, removal of the tapping machine and closing of valve 53, the apparatus of this invention can be mounted on the valve as shown in Figs. 1 to 3. In so doing, a screw-on flange 55 can be connected to housing 10 via threads 12 and bolted to the valve 53 or any other suitable connection can be made. An index, such as arrow 12a (Fig. 4) can be employed to secure proper rotational alignment of the plugger with respect to the pipe line. The valve can then be opened and shaft 22 rotated to move the plug member from its Fig. 2 position to its Fig. 3 position. In so rotating the shaft, it will be apparent that nut 24 will be advanced along threaded portion 23 of the shaft to advance carrier part 14. With the construction of the plug member shown in the drawings, the plug member will remain substantially in its Fig. 4 position relative to carrier part 14 until the plug member contacts the inner wall of pipe line 50 opposite opening 54. Continued movement of carrier part 14 toward the pipe line will cause arms 43 and 44 to urge the plug along the pipe line until the plug member is seated at one side of opening 54. Any fluid flow through the pipe line will also aid in moving the plug member into seated position. Then fluid pressure applied in the direction of the arrow in Fig. 3 will urge the lips of seal 38 outwardly into sealing engagement with the inner walls of the pipe line while arms 43 and 44 prevent the plug from moving downstream with the fluid. In this connection, it will be noted that should a large force be exerted by the pipe line fluid to tend to move the plug downstream, tubular part 17 will tend to bend. To limit such bending, circular plate 15 is provided with a slightly lesser diameter than that of opening 54 and is so positioned that with the plug member properly seated as in Fig. 3, plate 15 can abut against the edges of the opening 54 in the pipe line. As a result, tubular part 17 can bend only sufficiently to bring one edge of plate 15 in contact with the edge of the opening 54 and further movement is resisted by the pipe line itself.

When it is desired to retract the plug member from the pipe line, shaft 22 can be rotated to retract carrier part 14 thereby causing arms 43 and 44 to pivot about both carrier part 14 and the plug member. Since the plug member has a relatively close fit inside the pipe line and since, with the parallelogram linkage described above, the arms and pivotal axes are arranged to maintain it substantially parallel to the direction of movement of the carrier part, the arms will pull the plug member along the pipe line until it is situated centrally of opening 54 after which they lift it upwardly through the opening into housing 10. Valve 53 can then be closed and the plugging apparatus removed from the pipe line, if desired.

Since the plug member at its periphery (seal 38), which is to be brought into abutment with the pipe line, is of an outside diameter substantially equal to the inside diameter of the pipe line, and since T branch 51 preferably has an inner diameter substantially at least as large as that of the pipe line, the plug member should be moved until a plane through its periphery is substantially coincident with the central axis of housing 10 as illustrated in Fig. 6. Such an arrangement permits the plug member to be made with a rigid body portion and yet be withdrawn through T branch 51 without tearing or unduly crushing seal 38. To permit this, pivots 45 and 46 are laterally off-set from pivots 47 and 48 and also from the central axis of housing 10. Also, mutually engageable stop parts are provided to limit swinging movement of the plug member toward the carrier part to be such that seal 38 is situated on a diameter of housing 10 as the plug member is retracted into the housing; or, in other words, the maximum lateral dimension of the plug member is positioned to coincide with the maximum lateral clearance inside the housing. Such stop parts can comprise surfaces 60 and 61 on arms 43 and 44, respectively, so that with the plug member swung into its downmost position relative to carrier part 14, these surfaces are in abutment and prevent further swinging of the plug member around part 14.

The parallelogram linkage described above is preferred not only because it results in a strong and compact construction but also because it permits seating plug member 35 substantially normal to the longitudinal axis of the pipe line thereby not only requiring the smallest possible plug member but also one which is easiest to maintain in seated position. However, it is possible to make the plug member elliptical in its section through its periphery which is to contact the pipe line wall. In such event, the plug member will be inclined relative to the longitudinal axis of the pipe line when in seated position and the lengths of arms 43 and 44 as well as the relative positions of pivots 45 through 48 varied to give the plug member the desired movement into and out of the pipe line. Also, it is possible even with the circular plug member shown in the drawing to make arms 43 and 44 of different lengths and yet properly position the plug member transversely across the line as illustrated. In so doing, the relative positions of the pivots are varied and the plug member tilted as it leaves and enters the pipe line. In this connection, it should be noted that when the plug member is to be normal to the longitudinal axis of the pipe line when seated, the lengths of arms 43 and 44 and the relative positions of pivots 45 through 48 must be such that the plug will clear the lateral opening in the pipe line upon axial movement of carrier part 14.

It may further be noted that the lateral opening in the pipe line can be of other shapes than that described above as long as the plug member can pass therethrough. However, the above-described shape is preferred and is in accordance with present day pipe line standards.

Figure 7:
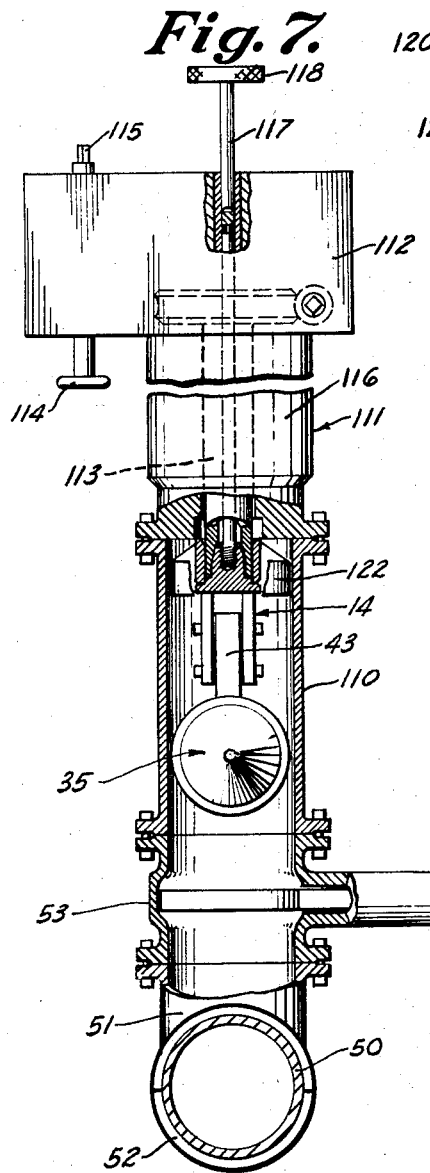
Fig. 7 illustrates the use of a tapping or boring machine for advancing and retracting the plug element into and out of the pipe line.

Referring now to Figs. 7 and 8, there is shown an apparatus similar to that above-described except that plugger housing 10 of Fig. 1 and the carrier means for advancing and retracting the plug member have been substituted by a nipple extension 110 and a tapping or boring machine 111. The latter can be of any construction known to those skilled in the art and can be the same machine referred to above with reference to cutting opening 54 in one wall of pipe line 50. For a more complete description of one preferred type of tapping machine, which is shown schematically in Fig. 7, reference is made to the instruction manual for the "Hillco Tapping Machine" sold by T. D. Williamson, Inc., of Tulsa, Oklahoma.

Referring to the tapping machine shown in the drawing, it can be seen it comprises an upper housing 112 within which is a drive mechanism for not only rotatably driving boring bar 113 but also for moving it longitudinally without rotation. The latter is accomplished by moving handle 114 to disengage a clutch (not shown) and then rotating shaft 115, as by a crank handle, to move the boring bar upwards and downwards without rotation. Boring bar 113 is housed within a depending sleeve 116 which provides a seal around the boring bar to prevent fluid from the pipe line escaping from the tool.

Extending through a central passage in the boring bar is a retainer rod 117 having a knob 118 at its upper end for turning the same and a threaded shank 119 at its lower end. Rod 117 is also provided with packing means between itself and the walls of the central passage in the boring bar preventing flow through this passage and limiting longitudinal movement of the rod downwardly toward the lower end of the boring bar. As will be best seen at Fig. 8, the lower end of boring bar 113 is provided with an internal conically shaped portion 120 and a depending cylindrical portion 121 which cooperate with the shank 119 to provide a means for attachment with the plug member and its mounting parts. As shown, carrier part 122, which corresponds to carrier part 15 in Fig. 4 and has the same function, can be provided with a conically tapered connecting part 123 fitting snugly within the corresponding portion of the boring bar. Part 123 is provided with a bore 124 threaded for connection with rod shank 119. It will be understood that upon turning of rod 117 within the boring bar, part 123 and carrier part 122 will be tightly secured to the bar.

A cylindrical portion 125 of connecting part 123, corresponding with and fitting closely within depending portion 121 of the boring bar, can be provided with outwardly extending lugs 126 which fit within corresponding slots 127 in portion 121 of the boring bar to prevent relative rotation between the boring bar and the connecting part and plug holder.

With this construction, it will be seen that after pipe line 50 has been tapped with an opening and when it is desired to move the plug member thereinto, carrier part 122 and the depending plug member are attached to the boring bar by inserting connecting part 123 into the lower end of the boring bar and then tightening rod 117 in its connection thereto. The tapping machine is then mounted on nipple 110 in a manner similar to that shown in Fig. 7. Then upon disengagement of the clutch by a movement of handle 114, shaft 115 can be rotated to move the plug member downwardly into a seated position in the pipe line similar to that shown in Fig. 3. Contrariwise, the plug member can be removed by rotation of shaft 115 in an opposite direction.

One advantage of the arrangement shown in Figs. 7 and 8 over that shown in Figs. 1–6 is that it is not necessary to provide the special carrier means for advancing and retracting the plug member as shown in Figs. 1–6 but, instead, the tapping machine used to tap the hole in the pipe line can also be used to land the plug member in position. However, one disadvantage of the arrangement shown in Figs. 7 and 8 is that it requires a tapping machine for each installation of a plugger and if a plurality of the pluggers are to be installed, then there must be provided a plurality of tapping machines. In the structure shown in Figs. 1–6, the plurality of pluggers and the carrier means therefor can be provided more cheaply. It is contemplated however, that a locking and blinding flange arrangement as shown in my corresponding application Serial No. 427,700 filed May 5, 1954, now U.S. Patent No. 2,771,096, and entitled "Fluid Tight Closure," can be substituted for or connected above carrier part 122 so that upon landing of the plugger in the pipe line, the locking flange can be locked and sealed with a mating locking flange on the upper end of T branch 51, rod 117 disengaged from connecting part 123 and the tapping machine removed. Valve 53 can then be removed, if desired, since the locking flange prevents flow from the T branch. The tapping machine can then be moved to another location to either tap a hole in the pipe line or to land another plugger therein.

Referring to the structure of Fig. 9, it can be appreciated that a plug member, or element, 150 is provided for insertion into pipe line 50. The function of plug 150 is the same as that of plug 35 in Fig. 4. In form, plug 150 is also circular in contour with an outside diameter slightly larger than that of the inside diameter of pipe line 50. Plug 150 is slightly larger than the inside diameter of 50 in that it employs a peripheral seal which is forced into an initial mechanical seal with the inner wall of the pipe line. A solid body portion, including a flange, or plate, 151 is cooperated with a nose piece 152 for capturing the peripheral seal 153 which has a cup form. The capture of the seal between the flange and nose is completed by the use of studs 154 extending through the nose, seal, flange and into an ear piece 155.

Ear piece 155 is, therefore, the base portion of the plug from which it is pivoted. Arms 156 and 157 have pivots 158 and 159 for their ends on ear 155. The other end of the arms are pivoted at 160 and 161, from a single carrier flange plate 162. The plane of plate 162 is at right angles to the plane of the seal structure on the plug.

The general pivoting function of the arms between the carrier member and the plug are as previously described in connection with Fig. 4. However, the linkage between the carrier member and plug of Figs. 9 and 10 is unique and distinguished from that of Fig. 4. Fig. 10 is particularly useful in illustrating the differences.

Fig. 10 is a false section of the portion of Fig. 9 taken from the left, toward the plug and its linkage to plate 162. This section enables one to more completely appreciate that pivots 158—161 are each defined by bolts which capture arms 156 and 157 to opposite sides of flange 162 and ear 155. It is apparent from Fig. 10 that when arms 156, 157 are captured against the common flange plate 162, the ends of the shanks of bolts 160 and 161, coming from the opposite surfaces of flange 162, must be brought flush with the surfaces in order to provide free pivoting of the arms with respect to the flange plate. Note that otherwise at least pivot bolt 161 would interfere with arm 156 moving past the pivot 161.

The structural requirements call for the bolts to be pinned to flange 162. In illustration of this arrangement, pins 163, 164 are placed in holes drilled through flange 162 and bolts 160, 161. The holes are completed through flange 162 to provide for driving the pins from their locking engagement between bolt and flange with a punch tool which can be inserted in the drilled holes.

Having appreciated the differences between the structural arrangements of Fig. 4 and Fig. 9 linkage, it is to be understood that, in similarity, the axes of pivots 160 and 161 are substantially parallel to the axes of pivots 158 and 159. The length of the arms 156 and 157 are substantially equal and the distance between the pivots of each pair are substantially equal. The description of this structural arrangement is that plug element 150 is connected to flange 162 by a particular form of parallelogram linkage. As a result, the circular plane of sealing member 153 is maintained substantially parallel to the housing axis along which flange 162 moves.

Note that the horizontal movement of plug 150 to the left is limited by abutment 165 formed of the lower portion of flange 162. Limitation of movement is specifically established by the contact between ear 155 and abutment 165. Movement to the right is, of course, limited by the length of arms 156 and 157.

The arrangement of structure illustrated by Figs. 9 and 10 offers simplification over the embodiment of Fig. 4. The arrangement of arms 156 and 157 on opposite sides of single carrier flange structure 162 gains significant compactness which is highly desirable in the limited confines of pipe line diameters where the greatest possible strength of the actuating members for the plugs is highly desirable to resist the stresses exerted by fluid pressures within the pipe line. The structure of Figs. 9 and 10 illustrates the possibility of an extremely rugged compact, actuating linkage between carrier and plug.

Carrier flange 162 is illustrated as solidly welded to a base member 166. Base 166 is in the form of a sleeve which, in function, may be compared to circular plate 15 and tubular member 17 of Fig. 4. Base 166 reciprocates within housing 167, mounted on the pipe line. In the center of flange 162 is mounted a shank member 168, forming a link between a landing apparatus and the carrier and plug.

Specifically, shank 168 may take the form illustrated in the instruction manual for "Hillco Tapping Machines" mentioned supra. The material of this manual illustrates shanks similar in form to 168 driven by boring bars. The shank is chamfered on its edges in order to fit easily into an accommodating hole in the end of boring bar 169. Retainer rod 170 is then brought through the center of boring bar 169 and threaded into shank 168 to retain the shank in the end hole of the boring bar. The boring bar is then reciprocated, without being rotated, by a landing apparatus. In addition to the Hillco boring bar form of landing apparatus, a form is also indicated in Fig. 4 and another form in Figs. 7 and 8.

The landed relation of the carrier and plug is illustrated in a phantom showing in the lower portion of Fig. 9. As indicated, the landing apparatus may be detached from shank 167 and the plug left in position, should this be desired. The general operation of this form of linkage between plug and carrier can be further appreciated from the description of Fig. 4. Of course, the specific arrangement of structure between carrier flange 162 and plug 150 remains unique to this disclosure of Figs. 9 and 10.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe line stopper of the type having a plugging means insertable into a line through a lateral opening in the line including, in combination, a housing adapted to be mounted on the line with the central axis of the housing extending laterally of the line and through said opening, carrier means mounted on the housing and having a portion thereof axially movable between a first and a second position, the first position being more remote from the longitudinal axis of said line than is the second position, a plug member adapted to extend transversely across the interior of the line and having a periphery engageable with the inner walls of said line, a pair of arms pivotally connected to said carrier portion for swinging movement about spaced apart axes extending transversely of the carrier portion, said arms also being pivotally connected to said plug member for swinging movement about such member on spaced apart axes, the pivotal axes on the plug member being respectively substantially parallel to the pivotal axes on the carrier portion whereby upon movement of the carrier portion toward said second position, the plug member is advanced through said opening and then laterally away along the line to a position at one side of the opening, the length of said arms relative to the spacing of said pivotal axes being such that with the carrier portion in said second position, the plug member is positioned transversely of the line with its said periphery in engagement with the inner walls of the line throughout the entire circumference thereof.

2. The pipe line stopper of claim 1, in combination with a stop part on at least one of said arms for limiting swinging movement of the plug member towards said housing central axis, said stop part being positioned so that when engaged, the pivotal axes on the plug member are laterally offset from the pivotal axes on the carrier part.

3. The pipe line stopper of claim 2, in combination with an abutment part carried by the carrier part in a position such that with the carrier part in its second position, said abutment part is opposite and immediately adjacent one edge of the opening in the line whereby a force applied to said plug member and tending to move said carrier part laterally will bring the abutment part into engagement with said edge of said opening.

4. The stopper of claim 1 wherein the lengths of said arms are substantially equal and wherein the distance between the pivotal axes on the carrier part is substantially equal to the distance between the pivotal axes on the plug member whereby a plane through said periphery of the plug member is maintained substantially parallel to the axis of movement of the carrier part.

5. The stopper of claim 4 wherein said plug member includes a lip type seal forming the periphery engageable with said walls of said line.

6. The stopper of claim 5 in combination with a stop part on at least one of said arms for limiting swinging movement of the plug member towards said housing central axis, said stop part being positioned so that when engaged, the pivotal axes on the plug member are laterally offset from the pivotal axes on the carrier part.

7. The stopper of claim 6 in combination with an abutment part carried by the carrier part in a position that with the carrier part in its second position, said abutment part is opposite and immediately adjacent one edge of the opening in the line whereby a force applied to said plug member and tending to move said carrier part laterally will bring the abutment part into engagement with said edge of said opening.

8. The stopper of claim 4 wherein said carrier means includes a drive shaft rotatably carried by the housing and secured against endwise movement relative to the housing, and means connecting said shaft and the carrier part to move the carrier part axially upon rotation of the shaft.

9. The stopper of claim 8 wherein said means connecting said shaft and axially movable part comprises a threaded connection therebetween, and wherein slide and guide parts are carried by the carrier part and housing to prevent relative rotation therebetween.

10. A pipe line plugger which comprises, in combination, a housing adapted to be mounted on a pipe line to extend laterally thereof and to surround a lateral opening in the wall of the pipe line, carrier means mounted on the housing and including a part within the housing mounted for axial movement toward and away from the pipe line, a plug member within the housing and of such size as to be movable from the housing through said opening into the pipe line and having a periphery sealingly engageable with the inner walls of said pipe line, a connection between said carrier part and said plug member including arms each pivotally connected to said carrier part and to said plug member to permit the latter, upon movement of the carrier part toward said pipe line, to move laterally away from the carrier and along said pipe line to a position across the interior of the pipe line at one side of said opening and, upon movement of the carrier part away from said pipe line, to be retracted along the pipe line into alignment with said opening and thence to be withdrawn into said housing.

11. The plugger of claim 10 wherein said arms are of substantially equal length and wherein the distance between the pivotal connections of the arms to the carrier part is substantially equal to the distance between the pivotal connections of the arms to the plug member so that the carrier part and plug member are connected by a parallelogram linkage to maintain a plane through said periphery of the plug member substantially parallel to the axis along which said carrier part moves in said housing.

12. The plugger of claim 10 wherein the sealing engageable periphery of the plug member includes a seal means of a size adapted to engage the inner walls of the line and form an initial seal therewith as the plug member moves laterally to said position across the line, said seal means being of a fluid pressure actuated type forming a tighter seal responsive to increased fluid pressure.

13. A pipe line plugger which comprises, in combination, a housing, carrier means mounted on the housing and including a part movable longitudinally in the housing along an axis of the carrier part, a circular plug member having a peripheral seal adapted to sealingly engage the inner walls of a pipe line and having a diameter lying parallel to said carrier part axis, a pair of parallel arms of substantially equal length, each arm being pivotally connected to the carrier part at a point spaced along said axis thereof from the pivotal connection of said other arm and to the plug member at a point spaced along said diameter from the pivotal connection of said other arm to the plug to thereby form a parallelogram linkage maintaining said diameter of the plug member substantially parallel to said axis of the carrier part upon swinging of the plug member laterally of the carrier part.

14. The plugger of claim 13 in combination with mutually engageable stop parts on said arms limiting movement of the plug member toward the carrier part axis and, upon engagement of stop parts, maintaining the pivot points on the plug member laterally offset from the pivot points on the carrier part.

15. A pipe line plugger of the type having a plugging means insertable into a pipe line through a lateral opening in the line including, in combination, a tubular housing adapted to be mounted transversely of the line to surround said opening, said housing having an inside diameter at least substantially as large as the inside diameter of the pipe line upon which it is to be mounted, carrier means mounted on the housing and including a part axially movable inside the housing toward and away from said pipe line, a plug member including a peripheral seal having an outside diameter substantially the same as the inside diameter of the pipe line, a pair of parallel arms each pivotally connected to the carrier part and to said plug member for movement about spaced apart axes on the carrier part and on the plug member, the axes of the pivotal connections of the arms to the plug member being substantially parallel to the axes of the pivotal connections of the arms to the carrier part with the spacing between the axes on the carrier part being substantially equal to the spacing between the axes on the plug member whereby, upon axial movement of the carrier part toward said pipe line, the plug member is advanced through the opening into the said line and then laterally along the line, the length of said arms being sufficient that with the carrier part advanced to a position toward the pipe line, the plug member is positioned and maintained across a portion of the pipe line to one side of said opening.

16. The plugger of claim 15 wherein the pivotal axes of said carrier part are laterally offset from the longitudinal axis of said housing and wherein mutually engageable stop parts are provided which, when engaged, limit swinging movement of the plug member about said carrier part to a position such that a diameter of the housing lies in a plane through the seal of the plug member.

17. The plugger of claim 16 wherein said carrier means includes a shaft rotatably mounted on the housing and fixed against endwise movement relative thereto, a threaded connection between the shaft and movable carrier part to advance and retract the latter upon rotation of the shaft, seal means between the shaft and housing, and wherein opposing ends of said carrier part are in fluid communication with each other to substantially reduce or eliminate pressure differential therebetween which would resist axial movement of said carrier part.

18. A pipe line plugger which comprises, in combination, a housing adapted to be connected to a pipe line, said housing having an endwise opening opposite a lateral opening in the pipe line, carrier means mounted on the housing and including a part axially movable within the housing toward and away from the pipe line, a plug member within the housing and movable therefrom through said opening, means pivotally connecting the plug member and carrier part and permitting swinging movement of the plug member, upon advancement of the carrier part toward the pipe line, laterally of the carrier part to permit movement of the plug member along the pipe line to a position across the pipe line at one side of said opening, said carrier means including a shaft extending from said housing, a connection between the shaft and housing mounting the shaft for rotation but fixing it against endwise movement relative to the housing, a connection between the shaft and carrier part axially moving the latter upon rotation of the shaft, seal means between the shaft and housing, said housing being fluid tight except for said endwise opening.

19. A pipe plugger of the type having plug means insertable into a pipe through a side opening in the pipe, comprising a fluid tight housing mountable upon a side of the pipe to surround said opening, carrier means movable within the housing toward and away from the pipe, a plug means adapted when in seated position to one side of the opening in the pipe to bridge across the pipe and form a seal therewith and when in retracted position to lie within said housing, connecting means pivotally connected to the carrier means and to the plug means so that the plug means is moved between retracted and seated positions responsive to actuation of the carrier means, said plug means having a lower portion thereof laterally offset from the pivotal connection between the connecting means and carrier means and exposed to contact and slide along the interior of the pipe as the plug means moves from retracted to seated position.

20. The plugger of claim 19 wherein the pivotal connection between the plug means and connecting means is laterally offset from the pivotal connection between the carrier means and connecting means when the plug means is in retracted position.

21. A pipe plugger of the type having plug means insertable into a pipe through a side opening in the pipe, comprising a fluid tight housing mountable upon a side of the pipe to surround said opening, carrier means movable within the housing toward and away from the pipe, plug means adapted to be placed in seated position to one side of the pipe opening and also to be retracted out of the pipe into said housing and including a central body portion which when the plug means is in seated position is a rigid fluid barrier and also including a peripheral seal extending around the body portion, and means connecting the plug and carrier means and causing movement of the entire plug means laterally along the pipe to seated position responsive to movement of the carrier means toward the pipe and also causing movement of the plug means out of the pipe and completely into the housing responsive to movement of the carrier means away from the pipe.

22. A pipe plugger of the type having a plug means insertable into a pipe through a side opening in the pipe comprising a fluid tight housing mountable upon a side of the pipe to surround said opening and having a major cross-sectional dimension of at least substantially the internal diameter of the pipe, carrier means movable in the housing toward and away from the pipe, plug means including a rigid central body portion of a size as to extend substantially across the pipe when the plug means is in seated position to one side of the pipe opening and a peripheral seal around the central body portion to form a seal between the central body portion and the interior of the pipe, and means connecting the carrier means and plug means and positioning the plug means in said seated position responsive to movement of the carrier means toward the pipe and moving the plug means entirely into the housing responsive to movement of the carrier means away from the pipe.

23. A pipe plugger of the type having plug means insertable into a pipe through a side opening in the pipe comprising a fluid tight housing mountable upon a side of the pipe to surround said opening and having a major cross-sectional dimension of at least substantially the internal diameter of the pipe, carrier means movable in the housing toward and away from the pipe, plug means including a rigid central body portion of a size as to extend substantially across the pipe when the plug means is in seated position to one side of the pipe opening and a peripheral seal around the central body portion to form a seal between the central body portion and the interior of the pipe, and means connecting the carrier means and plug means and positioning the plug means in said seated position responsive to actuation of the carrier means and moving the plug means from seated position to a retracted position entirely in said housing responsive to another actuation of the carrier means.

24. A pipe line plugger which comprises, in combination, a housing mounted on the line to be plugged, a carrier plate mounted in the housing and movable longitudinally in the housing on the axis of the housing, a circular plug member having a peripheral seal adapted to sealingly engage the inner walls of the pipe line and having a plane maintained parallel to the housing axis, two parallel arms of substantially equal length, each arm being pivotally connected to the carrier plate at a point spaced along the housing axis from the pivotal connection of the other arm and on opposite sides of the carrier plate and to the plug member at a point spaced along its vertical diameter from the pivotal connection of the other arm to thereby form a parallelogram linkage maintaining the plug member plane substantially parallel to the housing axis as the plug member is pivoted laterally of the carrier part.

25. The plugger of claim 24 in combination with a stop member of the carrier plate arranged to limit movement of the plug member toward the housing axis and upon engagement of the stop member which maintains the pivot points on the plug member laterally offset from the pivot points on the carrier plate.

26. The plugger of claim 25 in which, the carrier plate whose vertical plane is maintained normal to that of the plug member, the arms are pivotally connected to the vertical flange plate by capture with pivot bolts whose shank ends are arranged flush with the surface on the opposite side of the plate so as to permit freedom of pivoting between arms and flange plate.

27. A pipe plugger of the type having plug means insertable into a pipe through a side opening in the pipe, comprising a fluid tight housing mountable upon a side of the pipe to surround said opening, carrier means movable within the housing toward and away from the pipe, a plug means adapted when in seated position to one side of the opening in the pipe to bridge across the pipe and form a seal therewith and when in retracted position to lie within said housing, means pivotally connecting the plug means to the carrier means so that the plug means is moved between retracted and seated positions responsive to actuation of the carrier means, means maintaining a lowermost portion of the plug means thereof laterally offset from the pivotal connection between the connecting means and carrier means and exposed to contact and slide along the interior of the pipe as the plug means moves from retracted to seated position.

References Cited in the file of this patent

UNITED STATES PATENTS

| | | |
|---|---|---|
| 411,978 | Chisholm | Oct. 1, 1889 |
| 1,966,819 | Irvin | July 17, 1934 |
| 1,988,077 | Goodman | Jan. 15, 1935 |